April 14, 1931. H. G. ZOIA 1,800,491

SERVICE DEVICE

Filed July 1, 1926 2 Sheets-Sheet 1

Inventor
Hector G. Zoia
By Hull, Brock & West
Attorneys

April 14, 1931.  H. G. ZOIA  1,800,491
SERVICE DEVICE
Filed July 1, 1926  2 Sheets-Sheet 2

Inventor
Hector G. Zoia
By Hull, Brock & West
Attorneys

Patented Apr. 14, 1931

1,800,491

UNITED STATES PATENT OFFICE

HECTOR G. ZOIA, OF CLEVELAND, OHIO

SERVICE DEVICE

Application filed July 1, 1926. Serial No. 119,924.

This invention relates to devices for maintaining the temperature of foods and for serving the latter, and is particularly adapted for use in hotels and other places where a number of dishes, containing food, are stacked in a warm or cold compartment (according to the nature of the food to be served) and where a number of such dishes, correspondingly stacked, are carried at the same time by waiters for service to patrons. The present device is an improvement upon a device for the same general purpose and object shown in my U. S. Patent No. 1,330,568, issued February 10, 1920.

Figure 1:
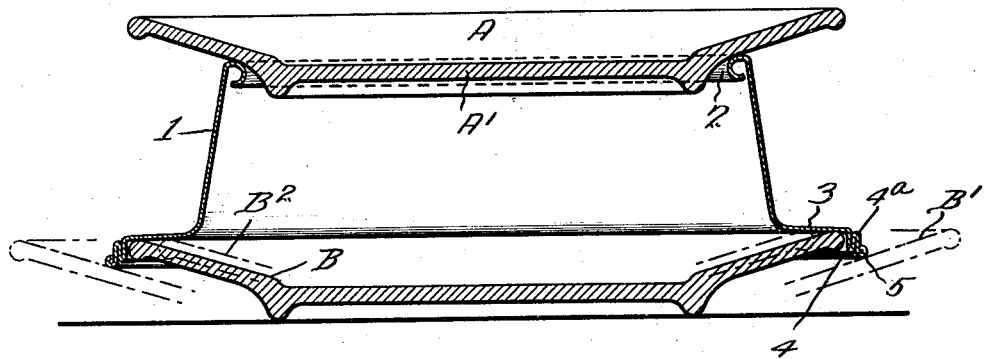
Figure 2:
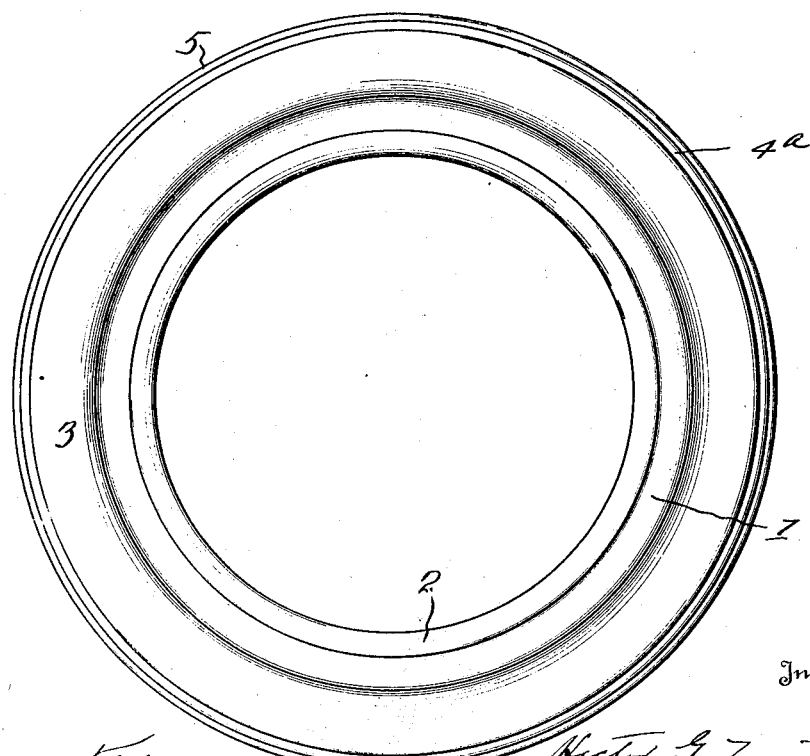

The object of the present invention is to provide an improved and simplified construction of food-surrounding and dish-spacing shell, which shell will serve, without the necessity for additional rings of rubber or similar material, to retain the temperature of the food served thereby while preventing the dislodgment of the dishes engaged by the top and bottom thereof under ordinary conditions of service. A further object of the invention is to provide a device of this kind with a special construction of top and bottom edges which enable the foregoing general object to be secured, as well as to adapt the shell for use with plates or similar dishes varying considerably in size. I accomplish the foregoing object, and other and more limited objects which will appear hereinafter, in and through the construction and arrangement of parts shown in the drawings, wherein Fig. 1 represents a central vertical sectional view through a service shell and upper and lower cooperating plates; Fig. 2 a plan view of the said shell; and Fig. 3 a view, similar to Fig. 1, showing a modified form of my invention.

Describing the various parts by reference characters, and with particular reference to the form of my invention shown in Figs. 1 and 2, the dish-spacing and food-surrounding shell comprises a frusto-conical side wall 1 of appropriate depth or height to space apart the upper and lower plates A and B a sufficient distance to enable the food upon the lower plate to be maintained out of contact with the bottom of the upper plate. The shell 1 is preferably made of sheet metal, aluminum being the metal which I prefer at present to use on account of its lightness. The upper edge of the shell is rolled inwardly to form a hollow bead 2 having a rounded upper surface which is adapted to engage and form a close joint with the bottom of the plate A. The diameter of the top of the shell 1 is such as to enable the base A' of the plate to be seated within the bead, the depending base serving to prevent the dislodgment of the plate A even under more than ordinary severe conditions of service. From the bottom of the frusto-conical part 1 of the shell there projects a substantially horizontal flange 3, said flange being of material width and having at its outer edge a depending flange 4 which is adapted to engage the outer edge of a plate B of appropriate size or to engage the edge of a smaller plate upon displacement of the latter and of the shell thereabove. The flange 4 is conveniently formed by bending the metal upon itself, the flange having three vertical folds of metal, the outermost fold $4^a$ extending below the other parts of the flange and being provided with a rounded bead 5 which is adapted to rest upon the upwardly sloping face of a plate B' which is of a larger diameter than the diameter of the flanged base of the shell, as indicated in dot-and-dash lines in Fig. 1. On the other hand, the flange 3 is of such width as to engage the top edge of plates $B^2$ of varying diameter less than the inner diameter of the flange 4 (as indicated by dot-and-dash lines in Fig. 1).

In use, the food-containing dishes A and B, with the interposed shells, may be stacked in an oven or a refrigerator, according to the nature of the food to be served. The dishes and shells may be removed and carried by the waiter, in stacked condition, the shells 1 forming such a close contact at their upper and lower edges with the plates respectively above and below the same as to prevent the loss of heat or cold by the food and, in the case of warm food, to retain the steam or moisture therewithin, this being rendered possible by the close contact established between the top and bottom of each ring and the bottom and top of the plates or dishes A and B. Any shock tending to dislodge the plates A and B laterally will be resisted by the bottom A' of the upper plate and by the depending flange 4 on the bottom of the ring engaging the edge of any plate which may be therewithin. When used with a larger lower plate, as B', the rounded bottom flange of the bead 5 will form a tight joint with said plate and the upward slope of the plate will prevent the ring and the plate thereabove from sliding over the edge of such larger plate.

The ring 1 may be made at a comparatively low cost, and is capable of being quickly and efficiently cleaned by reason of the absence of any additional plate-engaging rings of an absorbent character. The shape of the rings 1 enables them to be nested, when not in use, thus economizing in storage space.

Figure 3:
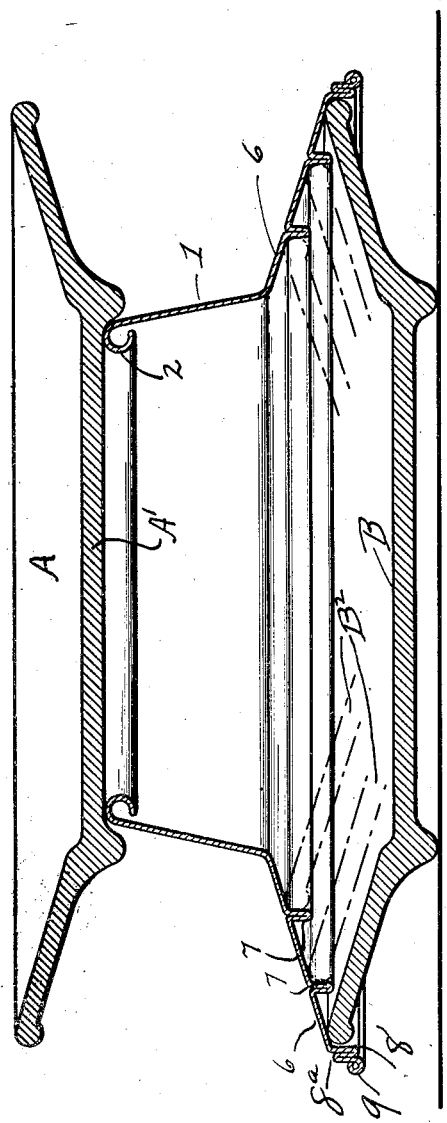

In Fig. 3, there is shown a modification of my invention wherein the parts A, A', B, B² and 1 and 2 are the same as shown in the preceding views. However, the wide flange 6 at the base of the ring 1 is provided with annular downwardly extending concentric ribs 7 each conveniently formed by bending the metal of said flange upon itself. As illustrated herein, two such ribs are shown which, together with the flange 8 provide three concentric seats adapted to engage the edges of three plates or dishes of varying diameter, as shown in full lines at B and in dot-and-dash lines at B². The peripheral flange 8, 8ª, 9 is formed in the same manner as the peripheral flange 4, 4ª, 5 in the preceding modification and will operate in the same manner as the flange in the preceding views when used in connection with a plate B' of larger size than the plate B.

This form of my invention is particularly adapted to prevent any shifting of the ring 1 and plate thereabove upon the supporting plate B therebeneath, even should such ring and upper plate be subjected to a force of considerable extent through the axis of said ring.

The form of my invention shown in Fig. 3 possesses in the main the same advantages as is possessed by the form shown in Figs. 1 and 2 and the additional advantage of affording greater resistance to the lateral shifting of a ring and plate thereabove upon the plate beneath such ring.

Having thus described my invention, what I claim is:

1. A combined service device and dish holder comprising an annular shell having its upper end rolled to provide an integral bead adapted to engage the bottom of an upper dish or plate and having at its bottom a wide substantially horizontal outwardly extending flange adapted to engage the upper outer edges of plates or dishes of varying diameter, the said flange having at the outer edge thereof a depending flange adapted to receive dishes or plates therewithin and to limit the relative lateral movement between such shell and plates or dishes of less diameter than said depending flange.

2. A combined service device and dish holder comprising an annular shell having its upper end rolled inwardly to provide a rounded inwardly projecting integral bead adapted to engage the bottom of an upper dish or plate and having at its bottom a wide outwardly extending flange adapted to engage the upper outer edges of plates or dishes of varying diameter, the said flange having at the outer edge thereof a depending flange adapted to receive dishes or plates therewithin and to limit the relative lateral movement between such shell and plates or dishes of less diameter than said depending flange.

3. A combined service device and dish holder comprising an annular shell having its upper end rolled inwardly to provide a rounded inwardly projecting bead adapted to engage the bottom of an upper dish or plate and having at its bottom a wide outwardly extending flange adapted to engage the upper outer edges of plates or dishes of varying diameter, said flange having at the outer edge thereof a depending flange adapted to receive dishes or plates therewithin and to limit the relative lateral movement between such shell and such plates or dishes, the last mentioned flange being provided at its bottom with a rounded bead adapted to support the shell upon a plate or dish of larger diameter than the inner diameter of such flange and to form a tight joint with the upper surface of such plate or dish.

4. A combined service device and dish holder comprising an annular shell having its upper end adapted to engage the bottom of an upper dish or plate and having at its bottom a wide outwardly extending flange adapted to engage the upper outer edges of plates or dishes of varying diameter, said flange having at the outer edge thereof a depending flange adapted to receive dishes or plates therewithin and to limit the relative lateral movement between such shell and such plates or dishes, the last mentioned flange being provided at its bottom with a rounded bead adapted to support the shell upon a plate or dish of larger diameter than the inner diameter of such flange and to form a tight joint with the upper surface of such plate or dish.

5. A combined service device and dish holder comprising an annular shell having its upper end adapted to engage the bottom of an upper dish or plate and having at its bottom a wide outwardly extending flange provided with concentric depending ribs which are adapted to engage the upper outer edges of plates or dishes of varying diameter, the said flange having at the outer edge thereof a depending flange or rib adapted to receive dishes or plates therewithin.

6. A combined service device and dish holder comprising an annular shell having its upper end rolled inwardly to provide a rounded inwardly projecting bead adapted to engage the bottom of an upper dish or plate and having at its bottom a wide outwardly extending flange adapted to engage the upper outer edges of plates or dishes of varying diameter the said flange having concentric depending ribs, the outermost rib constituting a marginal downwardly depending flange and the said ribs being adapted to receive therewithin dishes or plates of varying diameter.

7. A combined service device and dish holder comprising an annular shell having its upper end rolled inwardly to provide a rounded inwardly projecting bead adapted to engage the bottom of an upper dish or plate and having at its bottom a wide outwardly extending flange adapted to engage the upper outer edges of plates or dishes of varying diameter, the said flange having concentric depending ribs, the outermost rib constituting a marginal downwardly depending flange and the said ribs being adapted to receive therewithin dishes or plates of varying diameter, the marginal flange being provided at its bottom with a rounded bead adapted to support the ring upon a plate or dish of larger diameter than the inner diameter of such flange and to form a tight joint with the upper surface of such plate or dish.

In testimony whereof, I hereunto affix my signature.

HECTOR G. ZOIA.